United States Patent
Leiba et al.

(10) Patent No.: US 10,574,613 B2
(45) Date of Patent: Feb. 25, 2020

(54) CONTEXT-BASED PERSONALIZED SUMMARIZATION OF MISSED MESSAGES

(71) Applicant: INTERNATIONAL BUSINESS MACHINES CORPORATION, Armonk, NY (US)

(72) Inventors: Lior Leiba, Haifa (IL); Inbal Ronen, Haifa (IL); Naama Tepper, Haifa (IL)

(73) Assignee: International Business Machines Corporation, Armonk, NY (US)

(*) Notice: Subject to any disclaimer, the term of this patent is extended or adjusted under 35 U.S.C. 154(b) by 150 days.

(21) Appl. No.: 15/478,540

(22) Filed: Apr. 4, 2017

(65) Prior Publication Data
US 2018/0287981 A1 Oct. 4, 2018

(51) Int. Cl.
*G06F 15/16* (2006.01)
*H04L 12/58* (2006.01)
(Continued)

(52) U.S. Cl.
CPC ............ *H04L 51/16* (2013.01); *G06Q 10/10* (2013.01); *G06Q 50/01* (2013.01); *H04L 51/32* (2013.01);
(Continued)

(58) Field of Classification Search
CPC ...... G06Q 10/107; G06Q 50/01; G06Q 10/10; H04L 12/1813; H04L 51/16; H04L 67/22; H04L 51/32; H04L 67/306
See application file for complete search history.

(56) References Cited

U.S. PATENT DOCUMENTS 6,346,952 B1  2/2002  Shtivelman
8,326,880 B2  12/2012  Carson, Jr. et al.
(Continued)

FOREIGN PATENT DOCUMENTS

WO    2015061373 A1    4/2015

OTHER PUBLICATIONS

Dascalu et al., "A Deep Insight in Chat Analysis: Collaboration, Evolution and Evaluation, Summarization and Search," Artificial Intelligence: Methodology, Systems, and Applications (AIMSA 2010), 2010, p. 191-200, LNAI 6304, Springer-Verlag Berlin Heidelberg.
(Continued)

*Primary Examiner* — Padma Mundur
(74) *Attorney, Agent, or Firm* — Robert C. Bunker

(57) ABSTRACT

A method, computer system, and a computer program product for generating a chat summary personalized to a user is provided. The present invention may include receiving a plurality of input interactions associated with the user. The present invention may include determining a user profile based on the received plurality of input interactions, whereby the determined user profile includes a plurality of topics of interest. The present invention may include receiving a plurality of missed messages. The present invention may include determining a plurality of message clusters from the plurality of missed messages, whereby a topic is associated with each message cluster. The present invention may include ranking the determined plurality of message clusters based on comparing the topic associated with each message cluster to the plurality of topics of interest. The present invention may include presenting the ranked plurality of message clusters to the user.

18 Claims, 6 Drawing Sheets

(51) Int. Cl.
*H04L 29/08* (2006.01)
*G06Q 50/00* (2012.01)
*G06Q 10/10* (2012.01)
*H04L 12/18* (2006.01)

(52) U.S. Cl.
CPC ............ *H04L 67/22* (2013.01); *H04L 67/306* (2013.01); *H04L 12/1813* (2013.01)

(56) References Cited

U.S. PATENT DOCUMENTS

| | | | |
|---|---|---|---|
| 8,626,832 B2 | 1/2014 | Jerrard-Dunne et al. | |
| 8,782,145 B2 | 7/2014 | Cherukuri et al. | |
| 2007/0130257 A1* | 6/2007 | Bedi | G06Q 10/107 709/204 |
| 2014/0222834 A1 | 8/2014 | Parikh et al. | |
| 2014/0280614 A1 | 9/2014 | Alakuijala et al. | |
| 2015/0215241 A1* | 7/2015 | Zhou | H04L 51/16 709/206 |
| 2016/0147387 A1 | 5/2016 | Rahman et al. | |
| 2017/0134329 A1* | 5/2017 | Edgar | H04L 51/22 |

OTHER PUBLICATIONS

Daumé et al., "Bayesian Query-Focused Summarization," Conference of the Association for Computational Linguistics (ACL), 2006, 8 Pages.

Díaz et al., "User-Model Based Personalized Summarization," Information Processing and Management, Nov. 2007, p. 1715-1734, vol. 43, Issue 6, Elsevier Ltd.

Elsner et al., "You talking to me? A Corpus and Algorithm for Conversation Disentanglement," Proceedings of ACL-08: HLT, Jun. 2008, p. 834-842, Association for Computational Linguistics, Columbus, Ohio, USA.

Elsner et al., "You talking to me? A Corpus and Algorithm for Conversation Disentanglement," Slides Presented at ACL-08: HLT, Jun. 2008, 40 Pages, Association for Computational Linguistics, Columbus, Ohio, USA.

Elsner et al., "Disentangling Chat," Computational Linguistics, 2010, p. 389-409, vol. 36, No. 3, Association for Computational Linguistics.

Hong et al., "Empirical Study of Topic Modeling in Twitter," 1st Workshop on Social Media Analytics (SOMA '10), Jul. 25, 2010, p. 80-88, ACM, Washington, DC, USA.

Leiba et al., "Collabot Project—Demo Slides," IBM Connect Conference 2017, Feb. 21-23, 2017, p. 1-7, Grace Period Disclosure.

Mell et al., "The NIST Definition of Cloud Computing," National Institute of Standards and Technology, Sep. 2011, p. 1-3, Special Publication 800-145.

Sood et al., "Summarizing Online Conversations: A Machine Learning Approach," AND'12, 2012, 8 Pages, ACM, Mumbai, India.

Sood et al., "Topic-Focused Summarization of Chat Conversations," European Conference on Information Retrieval (ECIR 2013), 2013, p. 801-804, LNCS 7814, Springer-Verlag Berlin Heidelberg.

Uthus et al., "Plans Toward Automated Chat Summarization," Proceedings of the Workshop on Automatic Summarization for Different Genres, Media, and Languages, Jun. 23, 2011, p. 1-7, Association for Computational Linguistics, Portland, Oregon.

Yan et al., "Evolutionary Timeline Summarization: a Balanced Optimization Framework via Iterative Substitution," SIGIR'11, Jul. 24-28, 2011, p. 745-754, ACM, Beijing, China.

* cited by examiner

CONTEXT-BASED PERSONALIZED SUMMARIZATION OF MISSED MESSAGES

STATEMENT REGARDING PRIOR DISCLOSURES BY THE INVENTOR OR A JOINT INVENTOR

Aspects of the present invention have been disclosed by the inventors in the presentation "Collabot Project—Demo Slides," presented to the public at IBM Connect Conference 2017 from Feb. 21-23, 2017. The following disclosure is submitted under 35 U.S.C. § 102(b)(1)(A).

BACKGROUND

The present invention relates generally to the field of computing, and more particularly to social group chat.

Recent years have seen an unprecedented growth in social group chat usage that is characterized by an always on nature, making it hard for users to catch-up; especially after logging off for a certain amount of time, such as when attending a meeting or going home after the end of a workday.

SUMMARY

Embodiments of the present invention disclose a method, computer system, and a computer program product for generating a chat summary personalized to a user. The present invention may include receiving a plurality of input interactions associated with the user. The present invention may also include determining a user profile based on the received plurality of input interactions, whereby the determined user profile includes a plurality of topics of interest. The present invention may then include receiving a plurality of missed messages. The present invention may further include determining a plurality of message clusters from the plurality of missed messages, whereby a topic is associated with each message cluster. The present invention may also include ranking the determined plurality of message clusters based on comparing the topic associated with each message cluster within the plurality of message clusters to the plurality of topics of interest. The present invention may then include presenting the ranked plurality of message clusters to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
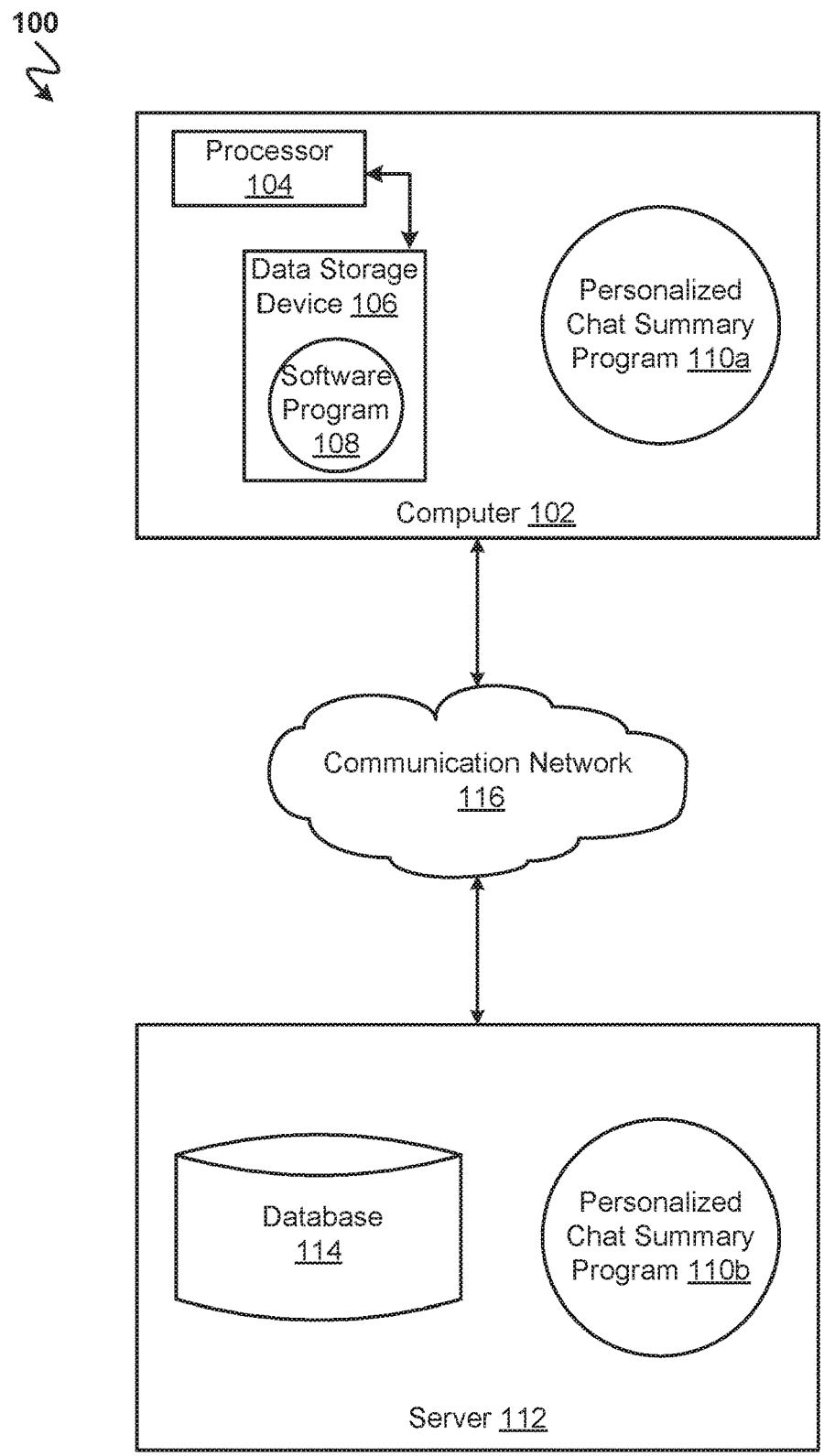
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described previously, recent years have seen an unprecedented growth in social group chat usage that is characterized by an always on nature, making it hard for users to catch-up; especially after logging off for a certain amount of time, such as when attending a meeting or going home after the end of a workday. In order to allow users to quickly catch up after an absence, a summary of missed content may be useful. As there are many users with different interests and many conversations occurring simultaneously in a chat room, an effective solution may be personalized, considering the individual differences between users' content preferences. However, traditional summarization algorithms ignore the personal context of a summary and may not consider individual differences.

Therefore, it may be advantageous to, among other things, provide a way to generate a personalized group chat summarization of missed messages from a group chat that may be relevant to the user.

The following described exemplary embodiments provide a system, method and program product for generating and presenting a personalized group chat summarization of missed messages. As such, the present embodiment has the capacity to improve the technical field of social group chat by generating a personalized summarization of relevant missed group chat messages based on user preferences. More specifically, group chat messages generated while a user is away or over a user-defined period of time may be analyzed and prioritized based on determining messages directly addressed to the user, messages that mention topics that the user is interested in, and messages associated with people related to the user. Additionally, messages may be prioritized based on determining that a message is a question to the user, an action item for the user, or a request of the user. After prioritizing the missed messages, the messages may be sorted based on priority and a threshold number may be selected as a summary of relevant messages for the user to catch up on what transpired in group chat while the user was away or during the user-defined period of time.

According to at least one embodiment, a personalized chat summary of group chat messages generated while a user is away or over a user-defined period of time may be generated. Personalization may occur in three dimensions including a topic-based dimension, a directed-to-user actions dimension, and a user social network dimension. Personalization based on topic may prioritize messages from topics that may be part of the user's topics of interest. Topics of interest may be learned from the past interactions of the user derived from chat history or from a larger set of the user's social, collaboration, and business interactions. Personalization based on directed-to-user actions may prioritize messages that directed to the user explicitly, such as with an @ mention annotation, or implicitly directed to the user by inference through social network analysis. Personalization based on a user's social network may prioritize messages from people that are related to the user as friends, and people that interact frequently within the group chat. The group chat summary may be generated by combining the three personalization dimensions to determine how relevant or important a message may be to the user.

The present embodiment may include two sub-systems. One sub-system may include a user profile that calculates and stores the user topics of interest and the user's social network. The second sub-system includes a summary generator that creates a personalized summary of group chat messages missed by the user. The user profile sub-system receives input signals such as chat transcripts. Additionally, the user profile may be enhanced with email, social media feed, and other data as input. The user-profile sub-system may include a processing and learning component that analyzes the input and extracts the user topics of interest and the user's social network. The user's social network may be a weighted list of people that are directly related to the user within a social media context. The output from the processing and learning component is a social network and the user's topics of interest. Topic extraction and social network analysis may be done, according to one embodiment, using a Latent Dirichlet Allocation (LDA) model for topic extraction and the social network may be used to extract immediate co-workers that mentioned the specific user.

The summary generation sub-system may begin by receiving a set of group chat messages that were generated while the user was away as input. Alternatively, the set of group chat messages may include messages that were generated in the group chat over a user-defined period of time, such as the last five hours. Then, the missed messages may be routed in parallel through a topic module and a social network module. The topic module and the social network module within the summary generation sub-system may communicate with the user profile sub-system discussed previously. The topic module may extract the message topics from the input set of missed messages and then compare the extracted message topics with the user's topics of interest retrieved from the user profile sub-system. Based on the comparison, a similarity score may be calculated and normalized between zero and one. In parallel, the social network module may extract the authors of the input set of missed messages and then compare the extracted authors with the user's social network retrieved from the user profile sub-system. Based on comparing the extract authors to the user's social network the messages may be ranked based on the proximity of the author to the user within the user's social network by determining and assigning a score that may be normalized.

The scored message rankings from the topics module and the social network module may be used to generate a single list that is re-ranked based on the combined score each message received from the topic module and the social network module. Thereafter the top N messages may be selected for generating a message summary for the user. The number of messages, N, required to generated the summary may be predefined according to at least one embodiment. According to at least one other embodiment, the messages chosen for generating the summary may be determined based on the scores assigned to each message and a threshold score. For example, if the threshold score is 0.8, then all messages with a combined score of 0.8 or higher may be selected for the summary.

Alternatively, the message score may not be combined and instead a summary may be generated that includes a section for the top N personalized topic-based messages and a section for the top M personalized social network-based messages. The top N messages and the top M messages may be selected by a predefined number or using a threshold score as described previously.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a personalized chat summary program 110a. The networked computer environment 100 may also include a server 112 that is enabled to run a personalized chat summary program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the personalized chat summary program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the personalized chat summary program 110a, 110b (respectively) to generate a personalized group chat summary of chat messages a user missed to present the most relevant missed messages to the user. The personalized chat summary method is explained in more detail below with respect to FIGS. 2 and 3.

Figure 2:
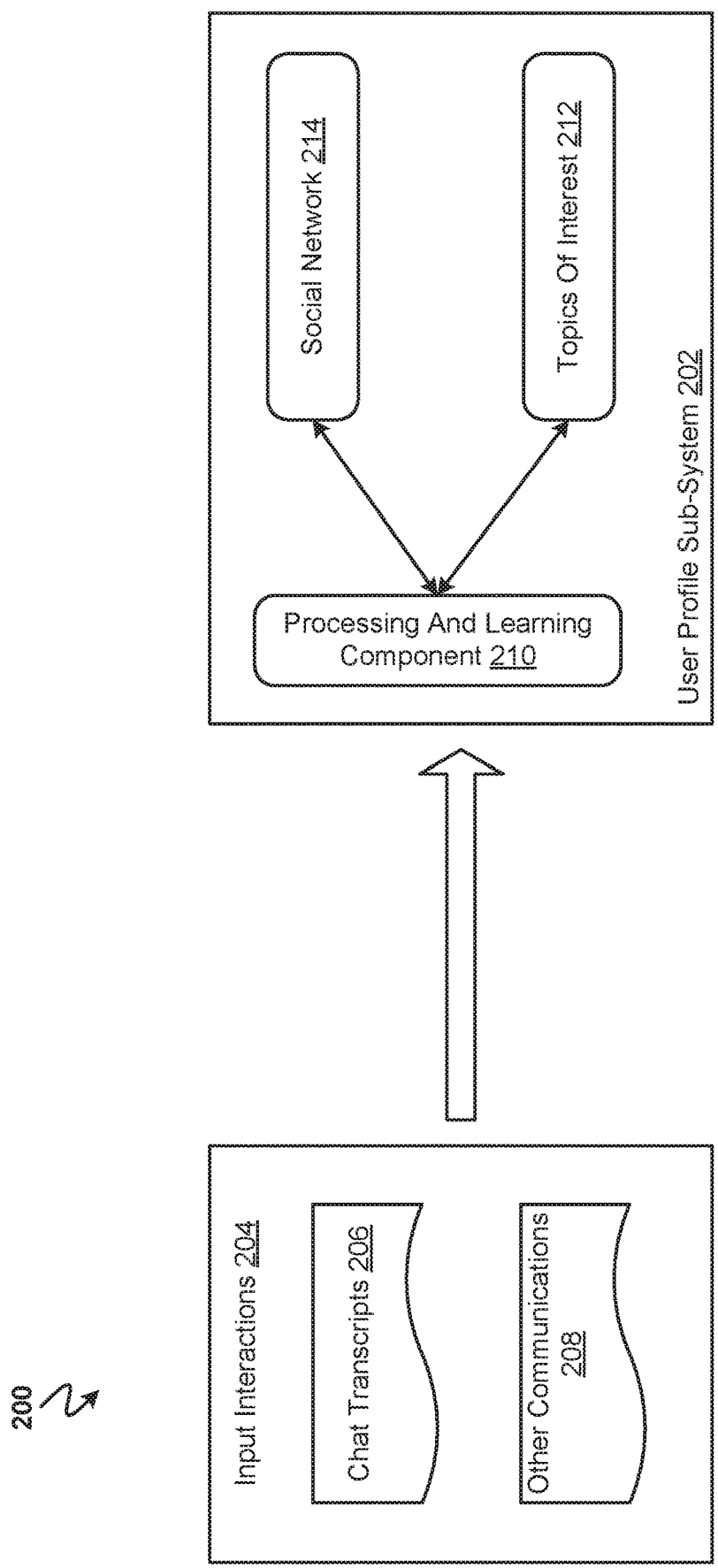
FIG. 2 is a system flow diagram illustrating a process for generating a user profile according to at least one embodiment.

Referring now to FIG. 2, a system flow diagram illustrating the exemplary user profile generation process 200 used by the personalized chat summary program 110a and 110b according to at least one embodiment is depicted.

The user profile sub-system 202 receives input interactions 204 such as chat transcripts 206 and other communications 208. Chat transcripts 206 include a record of the chat messages generated within a group chat that the user is a part of. Other communications 208 may include emails, meeting transcripts, social media interactions, business communications, and the like. Once the input interactions 204 have been received by the user profile sub-system 202, a processing and learning component 210 analyzes the input interactions 204 and extracts topics that interest the user and people that are directly related to the user within a social media context. Topics of interest 212 may be identified using an LDA model to analyze the input interactions 204 and then stored in a data repository, such as a database 114.

The user's social network 214 may be a weighted list of people that are directly related to the user within a social media context. Based on the input interactions 204, a social network may include a list of group chat participants and may be determined based on the authors of messages that implicitly or explicitly mention the user and the participants in a group chat discourse or segment that the user also participated in. For example, a group chat may include user Jeremy, and participants Mary, David, Julie. If Mary, David, and Julie participated in a group chat discourse with user Jeremy, then Jeremy's social network 214 will include Mary, David, and Julie.

From the list of participants that interact with the user in chat segments or mention the user, the participants may each have a score assigned indicating closeness to the user. The social closeness score may be determined based on participants that are identified as friends of the user within the group chat by the user and the frequency of interaction with the user within the group chat. Participants may be identified as friends to the user when a user adds a participant to a friend's list and a participant's social closeness score may further increase if the participant also added the user to the participant's friend's list. Additionally, data from the user's social media network may be analyzed to determine the user's friends that also participate in group chat with the user. Frequency of interaction may be determined by the number of chat segments a person participated in that the user was also a part of and the number of messages in which a person mentioned the user implicitly or explicitly. The number of messages involving the participant and the user may be counted and compared against the other participants within the determined social network 214. Participants that have a greater number of messages involving the user may be weighted greater or result in a larger social closeness score. The user's social network 214 and associated closeness scores may be stored in a data repository, such as a database 114.

Continuing the previous example, Mary may have participated in 5 group chat segments with Jeremy, David may have participated in 8 segments with Jeremy, and Julie may have participated in 11 segments with Jeremy. Furthermore, Mary and David may be on Jeremy's list of friends. After analyzing the participants (i.e., Mary, David, and Julie), a normalized social closeness score of 0.6 may be assigned to Mary, a score of 0.8 may be assigned to David, and a score of 0.4 may be assigned to Julie. Thus, the social network 214 may be ranked in order from highest to lowest as David, Mary, and then Julie.

Figure 3:
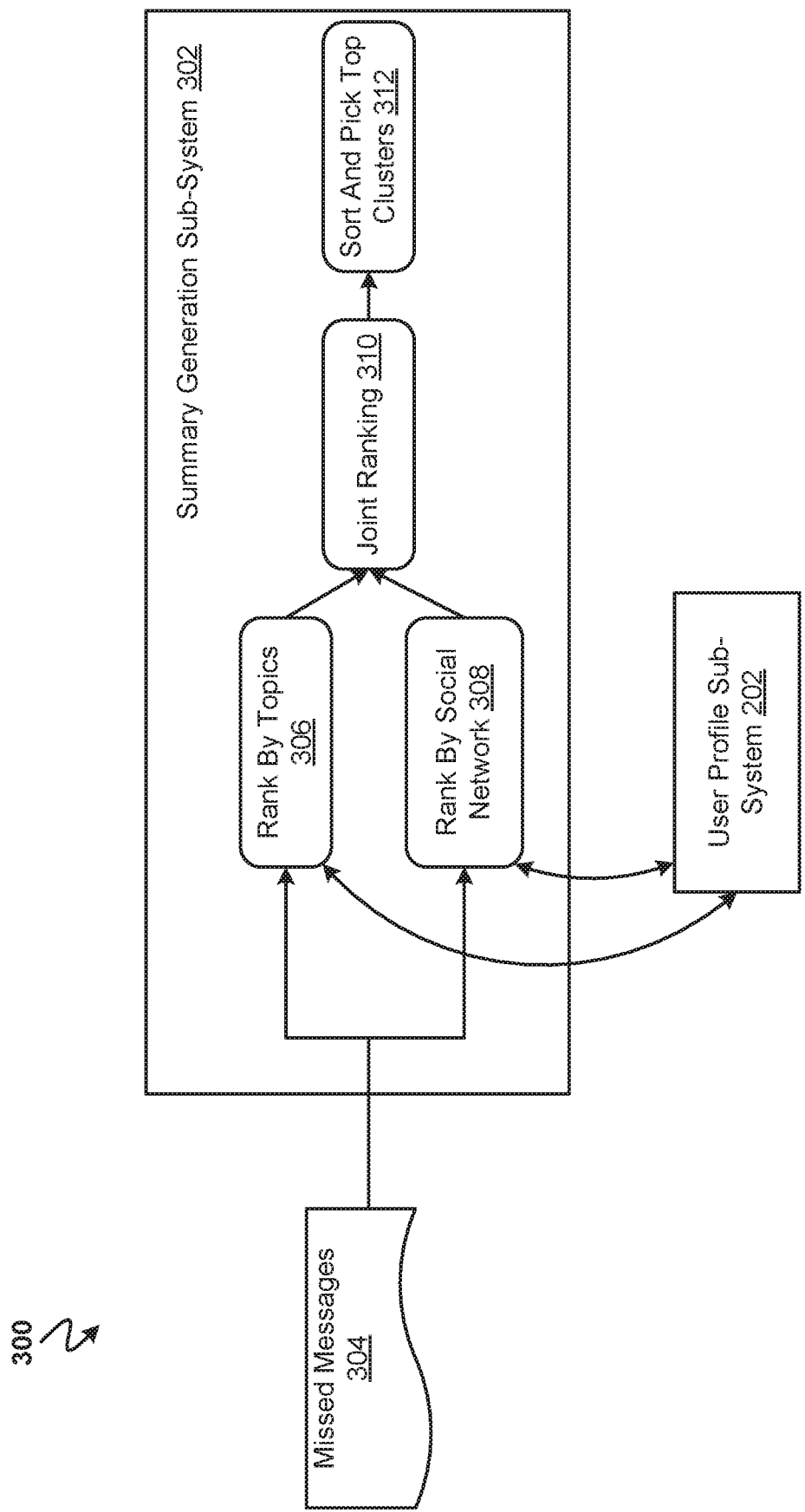
FIG. 3 is a system flow diagram illustrating a process for generating a personalized chat summary according to at least one embodiment.

FIG. 3 is a system flow diagram illustrating a process 300 for generating a personalized chat summary according to at least one embodiment. The summary generation sub-system 302 may begin by receiving a set of group chat missed messages 304 that were generated while the user was away. A set of group chat messages that were generated while the user is away may be collected by determining the time when the user leaves the group chat and then comparing the time the user leaves to the time the returns to the group chat. Alternatively, group chat messages may be collected corresponding to a user-defined period of time as the missed messages 304. Then, the missed messages 304 may be processed in parallel to rank by topics at 306 and rank by social network at 308. To rank the missed messages by topic at 306 and rank by social network at 308, the summary generation sub-system 302 may communicate with the user profile sub-system 202 to retrieve the topics of interest 212 and social network 214.

After the missed messages 304 are collected over the time period the user was away, known algorithms may be used to cluster subsets of the missed messages 304 based on topic. A known algorithm may parse the messages to determine messages that may be related based on words associated with topics that appear in the chat messages. Messages that occur in temporal proximity mentioning the same or similar topics, may be grouped into a cluster of messages. For example, if the user signed out from group chat at 8:00 p.m. Wednesday, and then signed back in at 6:00 p.m. on Saturday, then the missed messages 304 may include 200 messages that were generated in group chat while the user was away. Furthermore, the 200 messages may include eight related messages on the topic of camping and 20 related messages on the topic of football. The 200 missed messages 304 may be parsed using an LDA model to determine the topic of the conversation. The eight messages on the topic of camping may be clustered in a set of messages about camping and the 20 messages on the topic of football may be clustered in a set of messages about football.

At 306, the clustered messages are ranked by topics. The clustered messages may be parsed to extract the message topic and then compare the extracted message topics with the user's topics of interest 212 retrieved from the user profile sub-system 202. Based on the topic comparison, a similarity score may be calculated and normalized between zero and one. Clustered message topics that match, or are synonymous with, the topics of interest 212 may receive a similarity score of 1.0. For example, if the topics of interest 212 includes the topic "weather" and a topic extracted associated with a cluster of messages includes the topic "storm," the missed message cluster with the topic of "storm" may receive a similarity score of 1.0. Topics associated with a message cluster that are determined to be similar to one of the topics of interest 212 may receive a similarity score based on how similar the topics are. For example, the topics of interest 212 may include "football" and "cars," and the topic associated with a message cluster includes "baseball" and the topic associated with another message cluster includes "bus pass." While baseball and football are both sports, they are different sports, thus the "baseball" topic may receive a similarity score of 0.7. The "bus pass" topic may receive a similarity score of 0.3 since cars and bus passes are vaguely related to transportation, however, a bus pass is a document while a car is a mechanical device.

Furthermore, a message cluster topic may be similar to multiple topics of interest 212. For example, if the user's topics of interest 212 includes "technical seminars" and "Chicago," and the topic of a message cluster includes "attending a web development seminar in Chicago next month," then the message cluster topic may be related to two topics of interest 212. A similarity score may be computed to indicate the similarity of the message cluster topic to multiple topics of interest 212. Thus, the message cluster topic "attending a web development seminar in Chicago next month" may have a similarity score of 0.6 based on the "technical seminars" topic of interest 212 and a similarity score of 0.9 based on the "Chicago" topic of interest 212. Then, a combined similarity score may be computed for the message cluster topic that accounts for the similarity scores from the multiple topics of interest 212.

In parallel at 308, the message clusters are ranked by social network relation. The contributors of a message cluster may be extracted and then compared with the user's social network 214 retrieved from the user profile sub-system 202. Based on comparing the extracted authors to the user's social network 214, the message clusters may be ranked based on a social closeness score associated with the authors of each message cluster determined previously in the user profile sub-system 202. Continuing a previous example, if missed messages 304 include a message cluster with David and Mary as contributors and then a second message cluster with Julie and Mary as contributors, then the message cluster involving David and Mary will be ranked higher since David and Mary combined have a greater social closeness score than the message cluster involving Julie and Mary.

Then, at 310, the message clusters ranked by topic from 306 and the message clusters ranked by social network from 308 are used together to generate a single joint ranking list based on the combined score of each message cluster. The message clusters may have two scores associated with each message cluster, a similarity score and a social closeness score. The two scores may be combined using known methods, such as an average, to compute the combined score. Thereafter, the combined score may be associated with the corresponding message cluster. For example, if a message cluster has a topic score of 0.8 and a social network score of 0.5, the combined score for the message cluster may be 0.7.

Next, at 312, the message clusters are sorted and the top scored message clusters are picked for the summary. The message clusters in the missed messages 304 may be sorted based on the combined score determined previously at 310. According to at least one embodiment, the top N message clusters may be selected for generating a message summary for the user. The number of message clusters, N, required to generate the summary may be predefined. For example, if the number of message clusters is predefined to be three message clusters, then the top three messages may be selected for a chat summary. According to at least one other embodiment, the messages chosen for generating the summary may be determined based on comparing the combined scores assigned to each message with a threshold score. For example, if the threshold score is 0.8, then all message clusters with a combined score of 0.8 or higher may be selected for the summary.

After the top messages are picked at 312, the summary generation sub-system 302 presents the top messages as a summary of most relevant messages (i.e., top messages) that the user missed while away from the group chat or that were generated during a user-defined period of time. According to at least one embodiment, the summary message cluster topics may be presented to the user as round icons, or bubbles, whereby each message cluster topic may have a corresponding bubble. Within the bubble, a text string may indicate the topic title associated with the message cluster. Additionally, the bubble may include indicators, such as thumbnail pictures of the participants or avatars, that indicate the participants that are within the user's social network 214 that contributed to the message cluster. Further information may be included within the bubble such as the range of time when the cluster of messages was generated. The bubbles corresponding to the top message clusters selected previously may be displayed to the user on a screen. The user may interact with a bubble my clicking on the bubble with a mouse cursor or tapping on a touchscreen with a finger over the bubble. According to at least one embodiment, the bubbles corresponding to message cluster topics may be sized to indicate relative importance or relevance to the user. Thus, message clusters that were ranked higher previously at 312 may be represented with larger bubbles than lower ranked message clusters.

In response to the user interaction with a specific bubble, the bubble may expand to show the messages within the message cluster that are most relevant to the user. The most relevant messages within the message cluster may be selected based on determining a similarity score for the topics within the message cluster and determining a social closeness score for each message within the message cluster. Determination of a similarity score and social closeness score for each message may proceed similarly to how similarity and social closeness scores are determined for the message cluster described previously. The relevant messages displayed to the user may also include the participant indicator corresponding with the author of the relevant message and a timestamp indicating when the message was generated. Indicators, such as ellipsis, may be placed in between relevant messages to denote where messages that were not sufficiently relevant to the user are omitted from the message cluster. A button or other feature may be displayed as part of the expanded bubble view that allows the user to further expand the view to include all messages within the message cluster. If the user interacts with the button to indicate that the user wants to see the further expanded view of the all messages within the message cluster, then the previously omitted messages may be displayed to present all messages within the message cluster with a participant indicator and timestamp as described previously.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements. For example, according to at least one embodiment, joint ranking at 310 may be omitted and instead, two different orderings for the message clusters may be used for the summary. One ordering may be based solely on the similarity score and another ordering may be based solely on the social closeness score. The summary may then generate two sections: one containing the top N message clusters based on the similarity score and another section containing the top M message clusters based on the social closeness score. The value for N and M may be predefined, based on how many messages can be displayed clearly in the available amount of screen space, or based on some other method.

Figure 4:
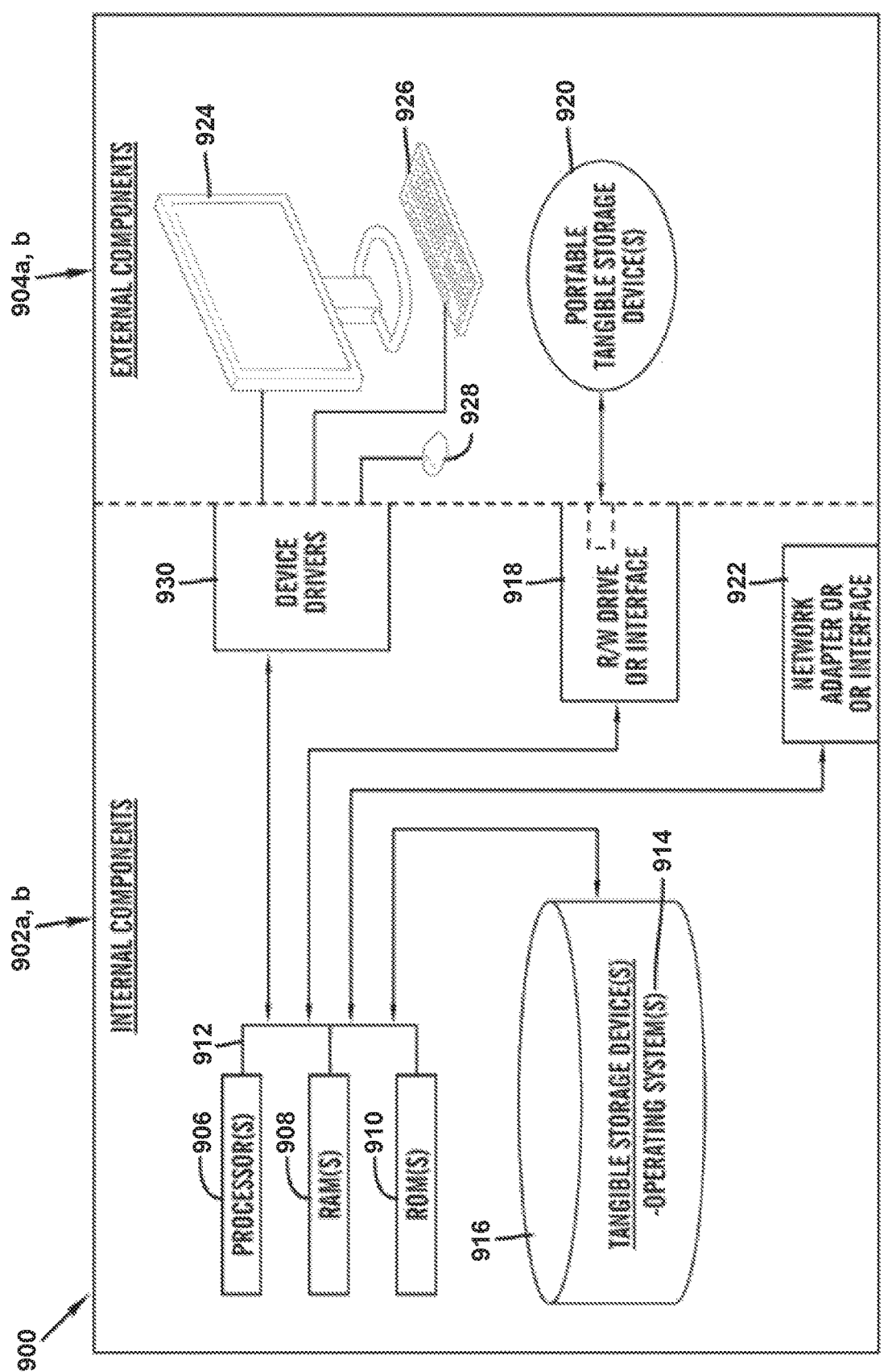
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the personalized chat summary program 110a in client computer 102, and the personalized chat summary program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the personalized chat summary program 110a and 110b can be stored on one or more of the respective portable computer-readable tangible storage devices 920, read via the respective R/W drive or interface 918, and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the personalized chat summary program 110a in client computer 102 and the personalized chat summary program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the personalized chat summary program 110a in client computer 102 and the personalized chat summary program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
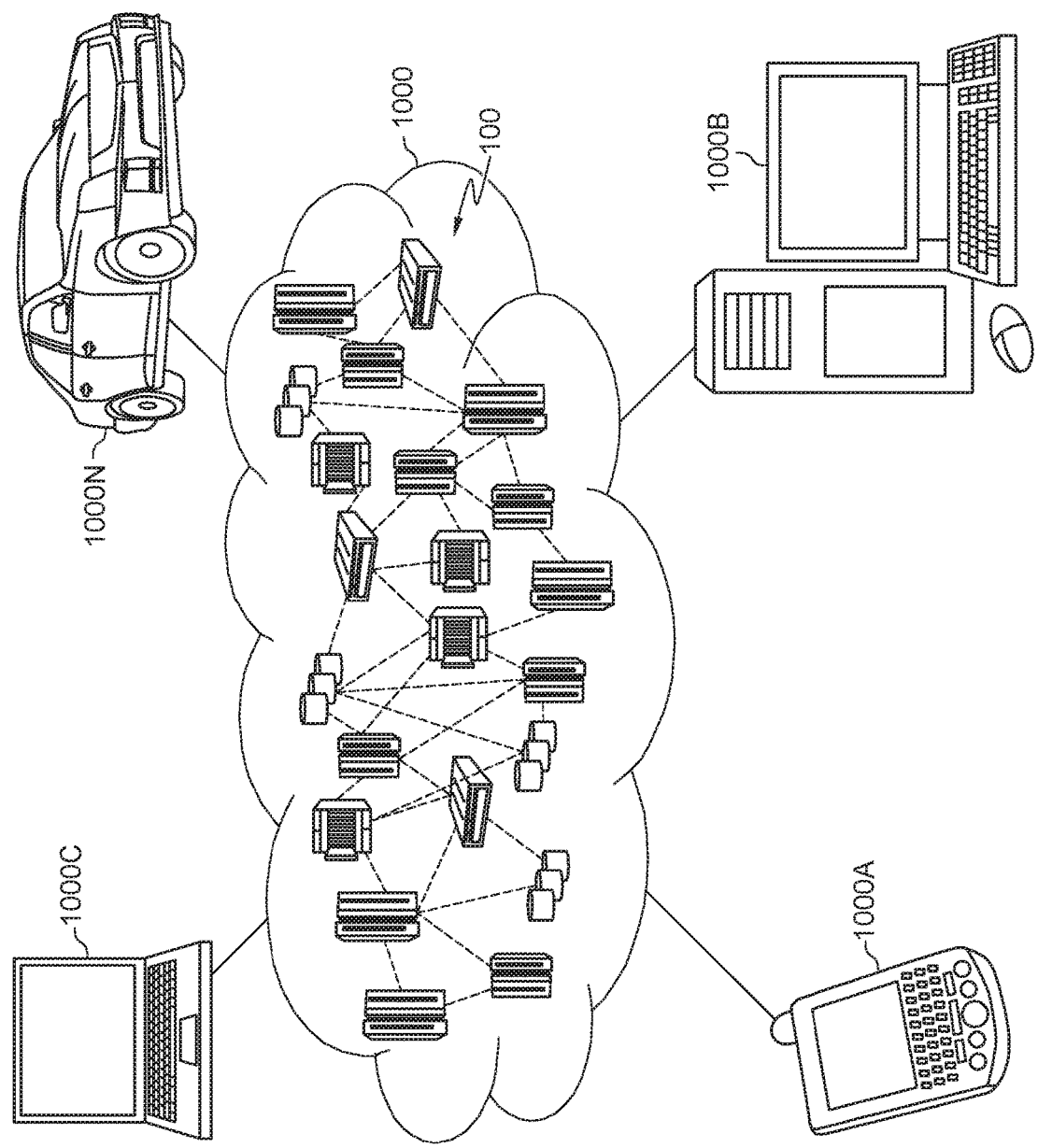
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
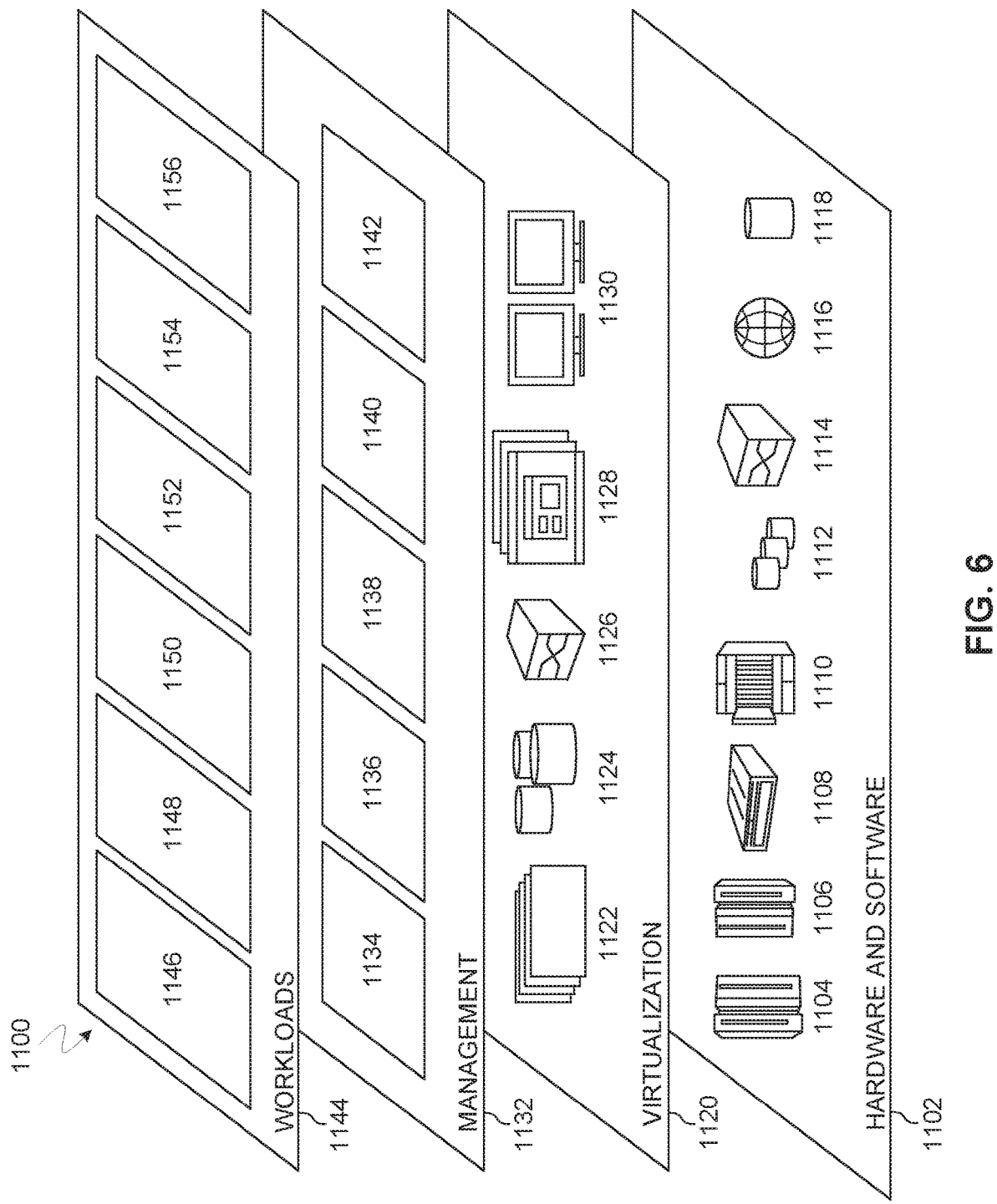
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and personalized chat summary 1156. A personalized chat summary program 110a, 110b provides a way to generate a personalized group chat summary of chat messages a user missed to present the most relevant missed messages to the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a chat summary personalized to a user, the method comprising:
   receiving a plurality of input interactions associated with the user, wherein the received plurality of input interactions includes chat transcript associated with an electronic chat interaction and the user;
   determining a user profile based on the received plurality of input interactions, wherein the determined user profile includes a plurality of topics of interest, wherein the plurality of topics of interest are determined based on analyzing the chat transcript to identify interaction topics associated with the input interactions and selecting the most relevant interaction topics as the plurality of topics of interest;
   receiving a plurality of missed messages;
   determining a plurality of message clusters from the plurality of missed messages, wherein a topic is associated with each message cluster;
   ranking the determined plurality of message clusters based on comparing the topic associated with each message cluster within the plurality of message clusters to the plurality of topics of interest; and
   presenting the ranked plurality of message clusters to the user.

2. The method of claim 1, wherein the user profile includes a social network, wherein the social network is determined based on the received plurality of input interactions, and wherein each message cluster within the plurality of message clusters has a plurality of authors.

3. The method of claim 2, wherein ranking the plurality of message clusters further comprises ranking the plurality of determined message clusters based on comparing the plurality of authors associated with each message cluster within the plurality of message clusters to the social network, and wherein presenting the ranked plurality of message clusters to the user includes presenting the a first plurality of message clusters ranked by the topic and presenting a second plurality of message clusters ranked by the social network.

4. The method of claim 1, further comprising:
   determining an away time based on when the user leaves a group chat;
   determining a return time based on when the user returns to the group chat; and
   determining an away period based on comparing the determined away time and the determined return time.

5. The method of claim 4, wherein receiving the plurality of missed messages comprises receiving a group of messages associated with the group chat, wherein the group of messages were generated during the determined away period.

6. The method of claim 1, wherein the input interactions further includes a plurality of emails associated with the user and a plurality of social network interactions associated with the user.

7. A computer system for generating a chat summary personalized to a user, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving a plurality of input interactions associated with the user, wherein the received plurality of input interactions includes chat transcript associated with an electronic chat interaction and the user;
   determining a user profile based on the received plurality of input interactions, wherein the determined user profile includes a plurality of topics of interest, wherein the plurality of topics of interest are determined based on analyzing the chat transcript to identify interaction topics associated with the input interactions and selecting the most relevant interaction topics as the plurality of topics of interest;
   receiving a plurality of missed messages;
   determining a plurality of message clusters from the plurality of missed messages, wherein a topic is associated with each message cluster;
   ranking the determined plurality of message clusters based on comparing the topic associated with each message cluster within the plurality of message clusters to the plurality of topics of interest; and
   presenting the ranked plurality of message clusters to the user.

8. The computer system of claim 7, wherein the user profile includes a social network, wherein the social network is determined based on the received plurality of input interactions, and wherein each message cluster within the plurality of message clusters has a plurality of authors.

9. The computer system of claim 8, wherein ranking the plurality of message clusters further comprises ranking the plurality of determined message clusters based on comparing the plurality of authors associated with each message cluster within the plurality of message clusters to the social network, and wherein presenting the ranked plurality of message clusters to the user includes presenting the a first plurality of message clusters ranked by the topic and presenting a second plurality of message clusters ranked by the social network.

10. The computer system of claim 7, further comprising:
    determining an away time based on when the user leaves a group chat;
    determining a return time based on when the user returns to the group chat; and
    determining an away period based on comparing the determined away time and the determined return time.

11. The computer system of claim 10, wherein receiving the plurality of missed messages comprises receiving a group of messages associated with the group chat, wherein the group of messages were generated during the determined away period.

12. The computer system of claim 7, wherein the input interactions further includes a plurality of emails associated with the user and a plurality of social network interactions associated with the user.

13. A computer program product for generating a chat summary personalized to a user, comprising:
    one or more computer-readable storage medium and program instructions stored on at least one of the one or more tangible storage medium, the program instructions executable by a processor, the program instructions comprising:
    program instructions to receive a plurality of input interactions associated with the user, wherein the received plurality of input interactions includes chat transcript associated with an electronic chat interaction and the user;
    program instructions to determine a user profile based on the received plurality of input interactions, wherein the determined user profile includes a plurality of topics of interest, wherein the plurality of topics of interest are determined based on analyzing the chat transcript to identify interaction topics associated with the input interactions and selecting the most relevant interaction topics as the plurality of topics of interest;

program instructions to receive a plurality of missed messages;

program instructions to determine a plurality of message clusters from the plurality of missed messages, wherein a topic is associated with each message cluster;

program instructions to rank the determined plurality of message clusters based on comparing the topic associated with each message cluster within the plurality of message clusters to the plurality of topics of interest; and program instructions to present the ranked plurality of message clusters to the user.

14. The computer program product of claim 13, wherein the user profile includes a social network, wherein the social network is determined based on the received plurality of input interactions, and wherein each message cluster within the plurality of message clusters has a plurality of authors.

15. The computer program product of claim 14, wherein ranking the plurality of message clusters further comprises ranking the plurality of determined message clusters based on comparing the plurality of authors associated with each message cluster within the plurality of message clusters to the social network, and wherein presenting the ranked plurality of message clusters to the user includes presenting the a first plurality of message clusters ranked by the topic and presenting a second plurality of message clusters ranked by the social network.

16. The computer program product of claim 13, further comprising:

program instructions to determine an away time based on when the user leaves a group chat;

program instructions to determine a return time based on when the user returns to the group chat; and program instructions to determine an away period based on comparing the determined away time and the determined return time.

17. The computer program product of claim 16, wherein receiving the plurality of missed messages comprises receiving a group of messages associated with the group chat, wherein the group of messages were generated during the determined away period.

18. The computer program product of claim 13, wherein the input interactions further includes a plurality of emails associated with the user and a plurality of social network interactions associated with the user.

* * * * *